United States Patent [19]

Takatori et al.

[11] Patent Number: 5,153,793
[45] Date of Patent: Oct. 6, 1992

[54] TWO-SIDED MAGNETIC RECORDING AND REPRODUCTION DEVICE

[75] Inventors: Tetsuya Takatori; Hitoshi Saito, both of Tokyo, Japan

[73] Assignee: Fuji Photo Film Co., Ltd., Kanagawa, Japan

[21] Appl. No.: 571,342

[22] Filed: Aug. 23, 1990

[30] Foreign Application Priority Data

| Sep. 5, 1989 | [JP] | Japan | 1-228318 |
| Feb. 6, 1990 | [JP] | Japan | 2-25205 |
| Feb. 16, 1990 | [JP] | Japan | 2-33867 |
| Feb. 20, 1990 | [JP] | Japan | 2-37492 |
| Apr. 13, 1990 | [JP] | Japan | 2-96396 |

[51] Int. Cl.$^5$ ............................................. G11B 5/60
[52] U.S. Cl. .................................. 360/102; 360/104
[58] Field of Search ................................. 360/104, 102

[56] References Cited

U.S. PATENT DOCUMENTS 4,709,285 11/1987 Enami ........................... 360/104 X
4,912,582 3/1990 Gomi ............................. 360/104 X

*Primary Examiner*—A. J. Heinz
*Attorney, Agent, or Firm*—Sughrue, Mion, Zinn, Macpeak & Seas

[57] ABSTRACT

The two-sided magnetic recording and reproduction device according to the present invention is very simple in structure in which a single negative pressure generating type stabilizing plate is used to achieve good contact of two magnetic heads with the front and backside of a magnetic disc, whereby position adjustment and assembly work of the individual members can be simplified to achieve a reduction in cost, the frictional resistance of the stabilizing plate to the magnetic disc can be reduced to reduce the driving torque, and abrasion to the magnetic disc and the magnetic heads can be suppressed. Furthermore, since the upper and lower heads are inclined to the inside and outside with respect to the magnetic disc, or, the surface of the stabilizing plate opposing the magnetic disc is inclined in the direction to the inner and outer peripheral sides, the gaps of the upper and lower magnetic heads are caused over their entire widths to come in sliding contact, thereby achieving a very good and stable head contact.

In addition, since there is provided supporting means for elastically supporting one of the upper and lower magnetic heads, a good contact of the magnetic heads following the magnetic disc is achieved, thereby enabling stable recording and reproduction.

3 Claims, 8 Drawing Sheets

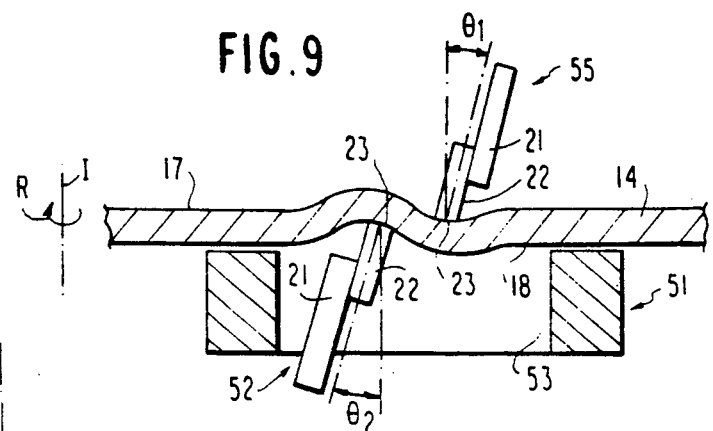
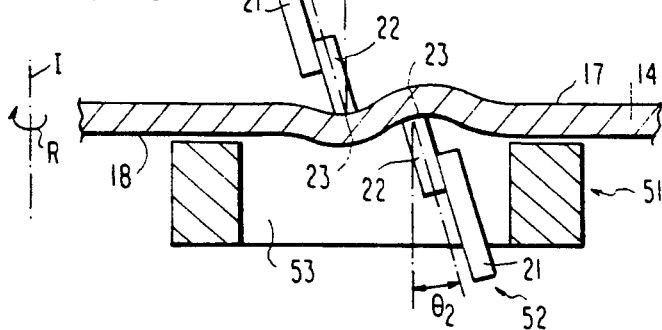
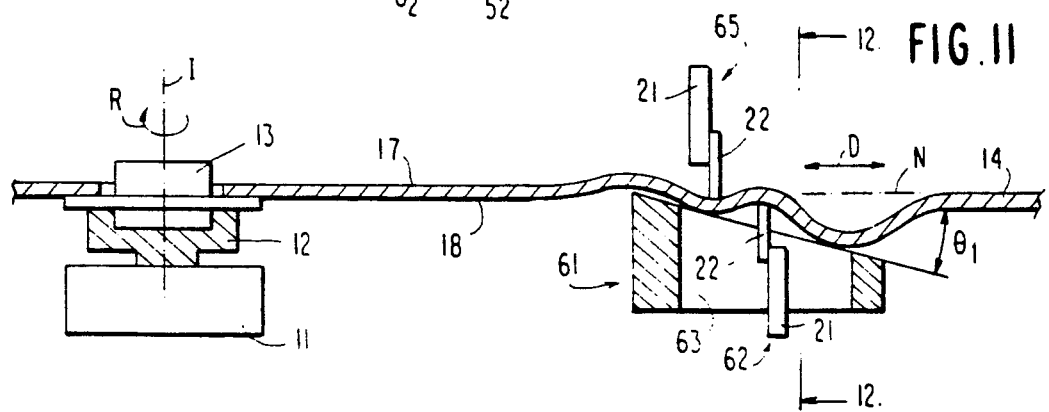
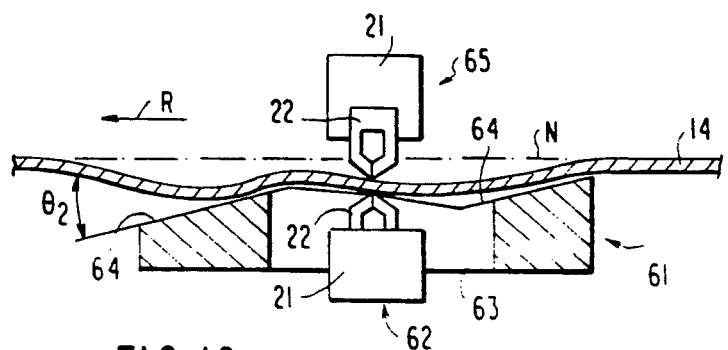
FIG.9
FIG.10
FIG.11
FIG.12

TWO-SIDED MAGNETIC RECORDING AND REPRODUCTION DEVICE

BACKGROUND OF THE INVENTION

This invention relates to a two-sided magnetic recording and reproduction device which utilizes both sides of a magnetic disc to make magnetic recording and reproduction.

Heretofore, there has been reported a two-sided magnetic recording and reproduction device using both sides of a magnetic disc, which is disclosed in Japanese Patent Publication Laid-open 63-18573/1988.

In this device, a magnetic disc 14 is mounted to a mounting portion 12 of a spindle motor 11 through a center hub 13. At both sides of the magnetic disc 14 are provided two magnetic head members 15 and 16 opposing each other approachable and withdrawable from individual recording surface 17 and 18 of the magnetic disc 14.

The individual magnetic head members 15 and 16 are provided with regulating members 19 which urge the magnetic disc 14 towards the individual opposite magnetic head members 15 and 16 and magnetic heads 20 in sliding contact with the individual recording surfaces 17 and 18. These magnetic head members 15 and 16 are shifted with respect to each other in the radial direction of the magnetic disc 14 so that the individual magnetic heads 20 are disposed between the regulating members 19 of the magnetic head members 15 and 16 and are disposed at both sides of the magnetic disc 14, shifting with respect to each other in the radial direction of the magnetic disc 14.

As shown in FIG. 26 showing an enlarged perspective view of the magnetic head 20, the magnetic head 20 is provided with a head body 22 mounted at the front end of a head mounting plate 21, and at the front end of the head body 22 is formed a gap 23 capable of coming in sliding contact with the recording surface 17 or 18 of the magnetic disk 14.

Therefore, when the magnetic disk 14 is rotated as shown in FIG. 25, the individual regulating members 19 of the magnetic head members 15 and 16 urge the individual recording surfaces 17 and 18 of the magnetic disc 14 so that the recording surfaces 17 and 18 come in sliding contact with the magnetic heads 20 opposing each other, attempting to achieve a good head contact.

In the prior art two-sided magnetic recording and reproduction device shown in FIG. 25, the positions of the regulating members 19 provided opposing the individual magnetic heads 20 must be adjusted very precisely with respect to the individual magnetic heads 20, requiring a tedious and difficult adjustment operation.

In such an example, since the individual regulating members 19 of the magnetic head members 15 and 16 urge and directly come in sliding contact with both of the recording surfaces 17 and 18 of the magnetic disc 14, the frictional resistance to the rotation of the magnetic disc 14 or the urging force to the head body 22 is inevitably increased. As a result, there have been posed problems that not only the magnetic disc 14 becomes difficult to rotate smoothly, but also the recording surfaces 17 and 18 of the magnetic disc 14 and the head body 22 tend to be damaged and worn.

Furthermore, referring to FIG. 27 which is an enlarged view showing the magnetic head member in FIG. 25, the head bodies 22 of the individual magnetic head members 15 and 16 are shifted in the radial direction of the magnetic disc 14 and protruded in the opposite directions to each other to come in sliding contact with the magnetic disc 14. Therefore, only end portions of the gaps 23 formed in these head bodies 22 contact the individual recording surfaces 17 and 18, which may cause poor recording and reproduction due to poor contact of these gaps 23.

SUMMARY OF THE INVENTION

In accordance with the present invention, which eliminates the above prior art problems, there is provided a first configuration of a two-sided magnetic recording and reproduction device comprising a negative pressure generating type stabilizing plate disposed opposite to a magnetic disc, a first magnetic head provided on the stabilizing plate and capable of slidingly contacting one recording surface of the magnetic disc, and a second magnetic head disposed movably closer to and away from the stabilizing plate across the magnetic disc and capable of slidingly contacting the other recording surface of the magnetic disc, the stabilizing plate having on its surface opposing the magnetic disc a recess provided surrounding the first magnetic head and inclined surfaces formed on the stabilizing plate individually at the upstream and downstream ends with respect to the rotational direction of the magnetic disc and opposing the magnetic disc, inclined so as to become distant from the free rotary surface plane of the magnetic disc towards the downstream side of the magnetic disc.

There is also provided according to the present invention a second configuration of a two-sided magnetic recording and reproduction device comprising a first magnetic head capable of causing its gap to come in sliding contact with one recording surface of a magnetic disc, a stabilizing plate disposed on the first magnetic head side for generating a negative pressure between the stabilizing plate and the magnetic disc in association with rotation of the magnetic disc to attract the magnetic disc towards the gap of the first magnetic head and achieve sliding contact with the gap, and a second magnetic head capable of causing its gap to slidingly contact with the other recording surface of the magnetic disc and disposed at an inside or outside of the magnetic disc with respect to the first magnetic head, when the second magnetic head is disposed at the inside with respect to the first magnetic head, individual mounting ends of the second magnetic head and the first magnetic head are radially inclined individually towards the inside and outside, respectively, or when the second magnetic head is disposed at the outside with respect to the first magnetic head, the individual mounting ends of the second magnetic head and the first magnetic head are radially inclined towards the outside and inside, respectively.

There is further provided according to the present invention a third configuration of a two-sided magnetic recording and reproduction device comprising a first magnetic head capable of causing its gap to come in sliding contact with one recording surface of a magnetic disc, a stabilizing plate disposed on the first magnetic head side for generating a negative pressure between the stabilizing plate and the magnetic disc in association with rotation of the magnetic disc to attract the magnetic disc towards the gap of the first magnetic head and achieve sliding contact with the gap, and a second magnetic head capable of causing its gap to slidingly contact with the other recording surface of the magnetic disc and disposed at an inside or outside of the magnetic disc with respect to the first magnetic head, when the second magnetic head is disposed inside with respect to the first magnetic head, the outside portion of the stabilizing plate opposing the magnetic disc being formed farther from the free rotary surface plane of the magnetic disc than the inside portion of the stabilizing plate, or when the second magnetic head is disposed outside with respect to the first magnetic head, the outside portion of the stabilizing plate opposing the magnetic disc being formed closer to the free rotary surface plane of the magnetic disc than the inside portion of the stabilizing plate.

As a fourth configuration of the present invention, there is provided a two-sided magnetic recording and reproduction device comprising upper and lower magnetic heads disposed opposing across a magnetic disc and capable of causing their individual front ends to come in sliding contact with the individual sides of the magnetic disc, and supporting means for elastically supporting one of these magnetic heads.

As the magnetic disc rotates at a high speed, a negative pressure is generated between the inclined surface and the recess of the stabilizing plate and the magnetic disc, and the magnetic disc is attracted towards the stabilizing plate to come in sliding contact with the first magnetic head provided on the stabilizing plate, thereby making recording and reproduction on one recording surface of the magnetic disc. At the same time, as described above, the second magnetic head comes closer to slidingly contact with the other recording surface of the magnetic disc which is stably positioned by the stabilizing plate, thereby making recording and reproduction on the other recording surface of the magnetic disc.

In this case, when the second magnetic head is positioned inside the first magnetic head, the individual mounting ends of the second and first magnetic heads are individually inclined towards the inside and outside of the first magnetic head, or when the second magnetic head is positioned outside the first magnetic head, the individual mounting ends of the second and first magnetic heads are individually inclined towards the outside and inside of the first magnetic head, to cause the entire gaps of the first and second magnetic heads to slidingly contact with the individual recording surfaces of the magnetic disc, thereby achieving a good head contact.

Or, since according to the position of the second magnetic head, inside or outside of the first magnetic head, the outside portion of the surface of the stabilizing plate opposing the magnetic disc is formed more distant from or closer to the free rotary surface plane of the magnetic disc than the inside portion of the surface of the stabilizing plate, the entire portions of the gaps of the first and second magnetic heads come in sliding contact with the individual recording surfaces of the deformed magnetic disc, thereby obtaining a good head contact.

Furthermore, since one of the pair of magnetic heads is elastically supported, roughness of position adjustment at the assembling work is absorbed, and the magnetic head follows the magnetic disc to achieve a good head contact, as well as a reduction in frictional resistance to the magnetic disc.

BRIEF DESCRIPTION OF DRAWINGS

FIG. 9 is a schematic enlarged cross sectional view showing the stabilizing plate.

FIG. 10 is a schematic enlarged cross sectional view showing another embodiment of the present invention.

FIG. 11 is a schematic cross sectional view showing the structure of another embodiment of the present invention.

FIG. 12 is a schematic cross sectional view taken along line XII—XII in FIG. 11.

DESCRIPTION OF PREFERRED EMBODIMENTS

A preferred embodiment of the two-sided magnetic recording and reproduction device according to the present invention will now be described in detail with reference to the drawings. Same parts and components as used in the prior art are indicated by the same reference numbers, and description thereof is omitted.

Figure 1:
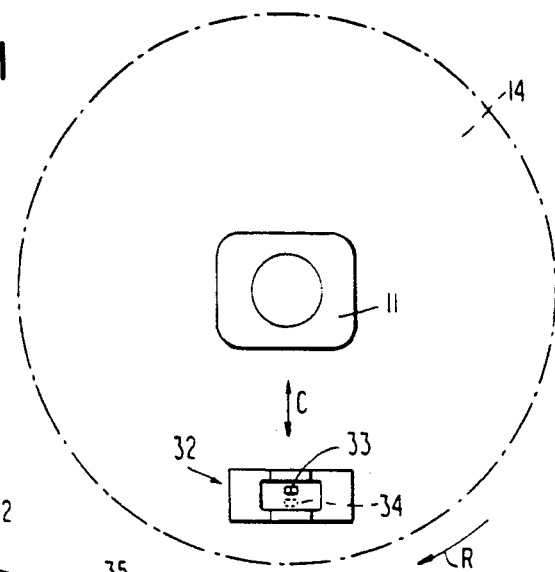
FIG. 1 a schematic plan view showing an embodiment of the two-sided magnetic recording and reproduction device according to the present invention.

Referring to FIG. 1 which is a plan view showing the embodiment, a negative pressure generating type stabilizing plate 32 is disposed opposite to one recording surface of a magnetic disc 14 which is rotated at a high speed by a spindle motor 11. The stabilizing plate 32 is provided with a magnetic head 33 capable of slidingly contacting the one recording surface by the function of a negative pressure generated by the stabilizing plate 32 in association with the rotation of the magnetic disc 14. At a position opposite to the stabilizing plate 32 across the magnetic disc 14 and outside of the magnetic head 33 with respect to the radial direction (arrow C in the Figure) of the magnetic disc 14 is disposed another magnetic head 34 capable of slidingly contacting the other recording surface of the magnetic disc 14, movable closer to and away from the recording surface.

The magnetic head 33, the stabilizing plate 32 and the other magnetic head 34 are individually supported by moving devices (not shown) so that they move along the radial direction (arrow C) of the magnetic disc 14 to change the track of the magnetic disc 14 to be recorded and reproduced.

Figure 2:
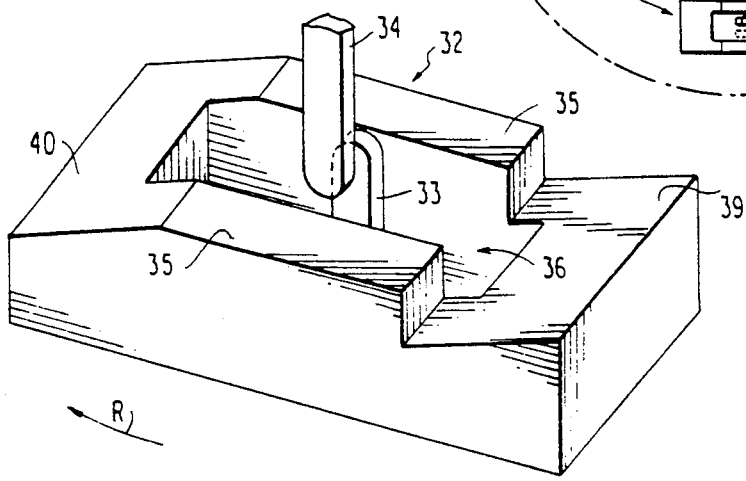
FIG. 2 is a schematic perspective view showing a stabilizing plate of the embodiment.
Figure 3:
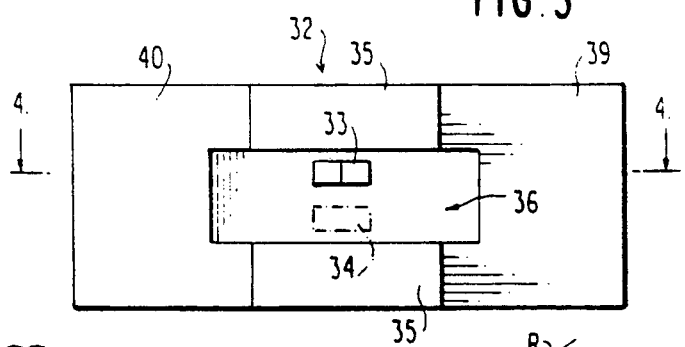
FIG. 3 is a schematic plan view showing the stabilizing plate.
Figure 4:
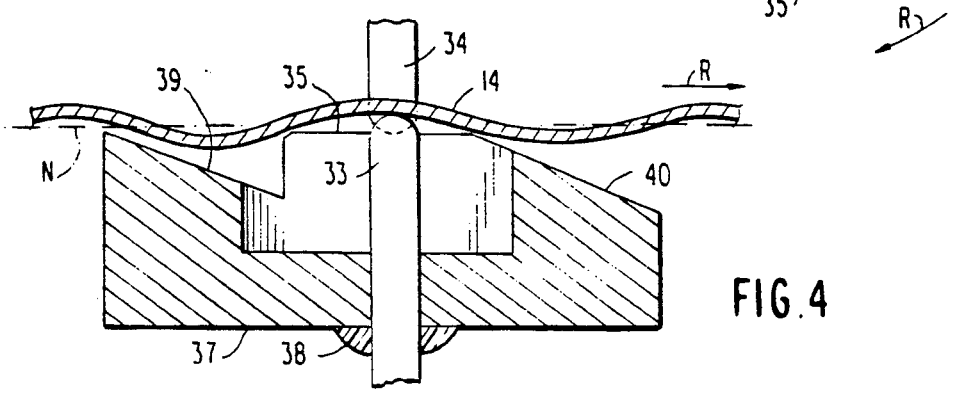
FIG. 4 is a schematic cross sectional view taken along line IV—IV in FIG. 3.

FIG. 2 is a schematic enlarged perspective view showing the stabilizing plate 32, FIG. 3 is its plan view, and FIG. 4 is a cross sectional view taken along line IV—IV in FIG. 3. As shown in these Figures, at almost the center of the surface of the stabilizing plate 32 opposing one recording surface of the magnetic disc 14 is formed a flat surface 35 almost parallel and adjacent to a free rotary surface plane N of the magnetic disc 14. On the flat surface 35 is formed a recess 36 to generate a negative pressure in association with a high-speed rotation of the magnetic disc 14. The free rotary surface plane N used in this specification means the rotational position of the magnetic disc 14 attached to a drive source of the main unit of the device, when the magnetic disc 14 is making a steady rotation without any external forces other than the rotational driving force applied to the magnetic disc 14.

The magnetic head 33 is disposed with its front tip protruded from a bottom surface 37 of the stabilizing plate 32 into the recess 36, and the tip is positioned slightly above the flat surface 35. The bottom surface 37 of the stabilizing plate 32 is provided with a sealing material 38 made of a synthetic resin or the like surrounding the magnetic head 33, whereby a negative pressure generated in the recess 36 is prevented from escaping through a gap between the stabilizing plate 32 and the magnetic head 33. Furthermore, at the outside of the magnetic head 33 with respect to the radial direction (arrow C) of the magnetic disc is disposed a magnetic head 34 which is movable closer to and away from the other recording surface of the magnetic disc 14.

At the upstream and downstream ends of the stabilizing plate 32 with respect to the rotational direction of the magnetic disc are individually formed negative pressure-generating inclined surfaces 39 and 40. These inclined surfaces 39 and 40 are individually formed so as to be more distant from the free rotary surface plane N of the magnetic disc 14 towards the downstream side with respect to the rotational direction of the magnetic disc, and upstream ends of the individual inclined surfaces 39 and 40 are positioned adjacent to the free rotary surface plane N.

Therefore, as the magnetic disc 14 rotates at a high speed, a negative pressure is generated between the magnetic disc 14 and the inclined surfaces 39 and 40 of the stabilizing plate 32, and between the magnetic disc 14 and the recess 36 of the stabilizing plate 36. As a result, the magnetic disc 14 is attracted to the stabilizing plate 32 side to come in sliding contact with the magnetic head 33, whereby recording and reproduction is made on one recording surface of the magnetic disc 14.

Furthermore, the other magnetic head 34 approaches and comes in sliding contact with the other recording surface of the magnetic disc thus stably positioned by the function of the stabilizing plate 32 to make recording and reproduction on this recording surface, thereby achieving simultaneous two-sided magnetic recording on the magnetic disc 14.

Figure 5:
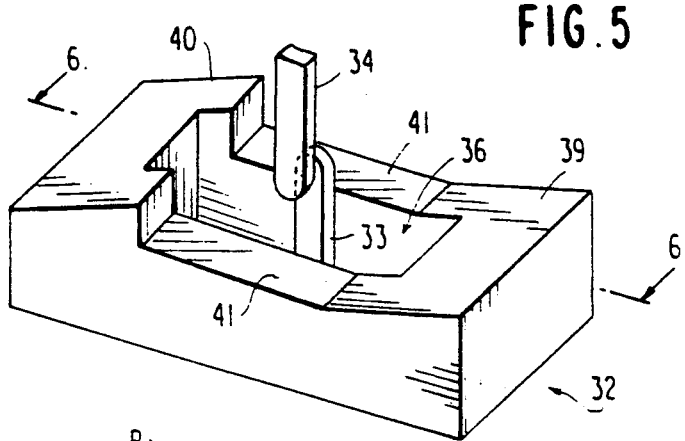
FIG. 5 is a schematic perspective view showing a stabilizing plate of another embodiment of the present invention.
Figure 6:
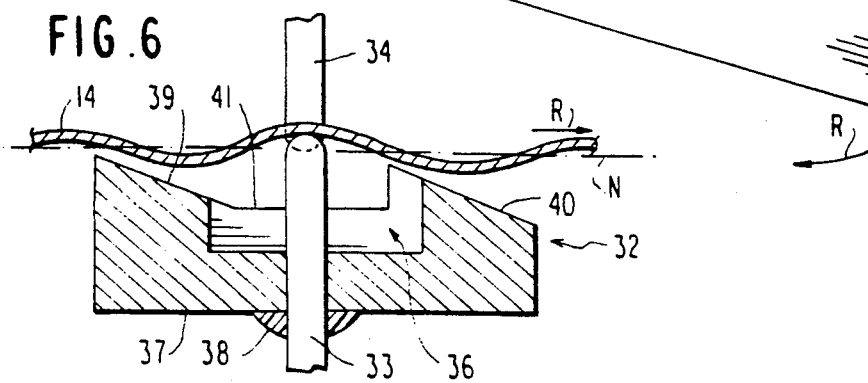
FIG. 6 is a schematic cross sectional view taken along line VI—VI in FIG. 5.

FIG. 5 is a schematic perspective view of another embodiment of the present invention, and FIG. 6 is an enlarged sectional view taken along line VI—VI in FIG. 5. These Figures individually correspond to FIG. 2 and FIG. 4 used for the description of the first embodiment. Therefore, the same parts and members as those used in the first embodiment are indicated by the same reference numbers and detailed description thereof is omitted.

In this embodiment, flat surface 35 of the stabilizing plate 32, which, in the first embodiment, is positioned along the free rotary surface plane N of the magnetic disc 14, is formed at a retreated position from the free rotary surface plane N. More specifically, a flat surface 41 in this embodiment is formed continuously to the downstream end of the inclined surface 39 formed at the upstream side with respect to the rotational direction of the magnetic disc. As a result, depth of the recess 36 of the stabilizing plate 32 is reduced and area between the flat surface 41 and the magnetic disc 14 is increased, whereby the area contributing to the generation of negative pressure is increased as a whole, resulting in an increased negative pressure.

In the embodiments described above, the surface of the stabilizing plate 32 is formed nearly rectangular. However, this may be formed to various other shapes, such as circular or rhombic forms. Furthermore, it is not necessary to form the cross section of the inclined surfaces 39 and 40 with straight lines, but may be formed with arc lines. And, the flat surfaces 35 and 41 are not necessarily required.

Figure 7:
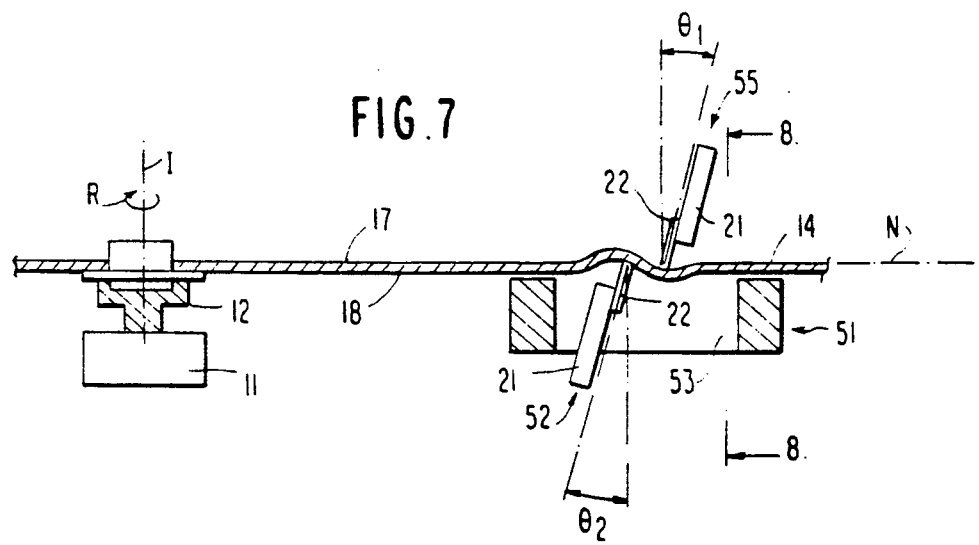
FIG. 7 is a schematic cross sectional view showing the structure of another embodiment of the present invention.
Figure 8:
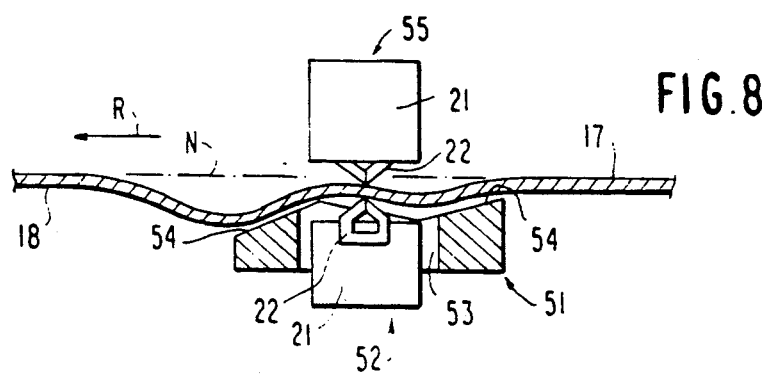
FIG. 8 is a schematic cross sectional view taken along line VII—VII in FIG. 7.

Another embodiment of the present invention is shown in FIG. 7, and its cross sectional view taken along line VIII—VIII in FIG. 7 and in FIG. 8. A stabilizing plate 51 is disposed beneath the magnetic disc 14. The stabilizing plate 51 has at its center a vertical through hole 53 into which a magnetic head 52 is inserted. On the surface of the stabilizing plate 51 opposing the other recording surface 18 of the magnetic disc 14 is formed an inclined surface 54 which is inclined so as to become more distant from the free rotary surface plane N of the magnetic disc 14 towards the downstream side with respect to the rotational direction (arrow R) of the magnetic disc 14. In the Figures, shaft I is the center of rotation of the magnetic disc 14.

With high-speed rotation of the magnetic disc 14, a negative pressure is generated between the inclined surface 54 of the stabilizing plate 51 and the magnetic disc 14, and the magnetic disc 14 is elastically deformed and attracted to the stabilizing plate 51 side to come in sliding contact with a magnetic head main body 22 of the magnetic head 52.

As shown also in FIG. 7, above the magnetic disc 14, the other magnetic head 55 is disposed which is offset from the magnetic head 52 of the stabilizing plate 51 side to the outer peripheral side of the magnetic disc 14. The mounting end of the magnetic head 55 is inclined by $\theta_1^0$ to the outer peripheral side of the magnetic disc 14, and the mounting end of the magnetic head 52 is inclined by $\theta_2^0$ to the inner side of the magnetic disc 14.

Furthermore, in this embodiment, the stabilizing plate 51 side magnetic head 52 and the stabilizing plate 51 are mounted to a support member (not shown) in positions slightly apart from the free rotary surface plane N as shown in FIG. 8. The magnetic head 55 opposing the stabilizing plate 51 is supported by a supporting mechanism (not shown) to be movable closer to and away from the magnetic disc 14.

Therefore, as shown in FIG. 9 which is an enlarged cross sectional view of the stabilizing plate 51, by the function of the stabilizing plate 51, the magnetic disc 14 is attracted towards the magnetic head 52 positioned below to come in sliding contact with the tip of the magnetic head 52, whereby recording and reproduction on the one recording surface 18 of the magnetic disc 14 is made. At the same time, to the other recording surface 17 of the magnetic disc 14 which is maintained at a stabilized position by the function of the stabilizing plate 51, the other magnetic head 55 moves closer from the upper side to come in sliding contact, whereby recording and reproduction on the recording surface 17 is made.

As described above, since the stabilizing plate 51 attracts and retains the magnetic disc 14 to one side to achieve stable positioning of the individual magnetic heads 52 and 55, it involves only a very small frictional resistance and thus abrasion to the magnetic disc 14 and the magnetic heads 52 and 55 can be prevented, compared to prior art regulating members 19 and the like which directly pinch the magnetic disc 14 from both sides.

Furthermore, in this case, since the individual magnetic heads 55 and 52 are disposed with angles $\theta_{11}^0$ and $\theta_2^0$ as shown and described above, the gaps 23 of the magnetic heads 55 and 52 are able to come over their entire widths in sliding contact with the recording surfaces 17 and 18 of the magnetic disc 14, thereby obtaining a good and stable head contact.

FIG. 10 shows another embodiment of the present invention. In this embodiment, the magnetic head 55 disposed on the opposite side (upper side) to the stabilizing plate 51 across the magnetic disc 14 is positioned at an inner peripheral side of the magnetic disc 14 with respect to the magnetic head 52 of the magnetic disc 14 side. In this case, the deformation condition of the magnetic disc 14 is the reverse of the above-described embodiment, and the inclinations of the magnetic heads 52 and 55 to improve the sliding contact condition of the gaps 23 are reverse to those in the preceding embodiment.

Specifically, the mounting end of the magnetic head 52 at the stabilizing plate 51 side is inclined by $\theta_2^0$ towards the outer peripheral side of the magnetic disc 14, and the mounting end of the magnetic head 55 opposite to the stabilizing plate 51 is inclined by $\theta_1^0$ towards the inner peripheral side of the magnetic disc 14. Thus, also in this embodiment, the gaps 23 of the individual magnetic heads 52 and 55 are able to come over their entire widths in sliding contact with the recording surfaces 18 and 17 of the magnetic disc 14, thereby obtaining a good and stable head contact.

In the above-described embodiments, the stabilizing plate which generates a negative pressure between the magnetic disc 14 and the stabilizing plate in association with high-speed rotation of the magnetic disc 14 is formed as one which has the inclined surface 54. Alternatively, however, the stabilizing plate may be provided with a recess opposite to the magnetic disc 14. Furthermore, the configurations of the magnetic heads 52 and 55 are not restricted to those in these embodiments, and the driving and supporting mechanisms for the magnetic heads 52 and 55 to come in sliding contact with the magnetic disc 14 and the supporting mechanism of the stabilizing plate 51 and the like are not restricted to these embodiments but may be flexibly designed. The angles $\theta_1$ and $\theta_2$ may be either the same or different.

FIG. 11 shows another embodiment of the present invention, and FIG. 12 is a schematic sectional view taken along line XII—XII in FIG. 11. As shown in these Figures, a stabilizing plate 61 is disposed beneath the magnetic disc 14. The stabilizing plate 61 is provided at its center with a through hole 63 into which a magnetic head 62 is inserted, and the magnetic head 62 is disposed slightly protruding from the through hole 63 and with its central axis perpendicular to the free rotary surface plane N of the magnetic disc 14. On the surface of the stabilizing plate 61 opposite to one recording surface 18 of the magnetic disc 14 is formed an incline surface 64 to become farther from the free rotary surface plane N of the magnetic disc 14 (e.g. with an angle $\theta_2^0$ as shown in FIG. 12) towards the downstream side with respect to the rotational direction (arrow R) of the magnetic disc 14.

On the side opposite to the stabilizing plate 61 across the magnetic disc 14 is disposed another magnetic head 65 shifted to the inner peripheral side of the magnetic disc 14 with respect to the magnetic head 62 and with its central axis perpendicular to the free rotary surface plane N of the magnetic disc 14. In this embodiment, this magnetic head 65 is supported movably closer to and away from the magnetic disc 14 by a supporting mechanism (not shown), and the stabilizing plate 61 and the magnetic head 62 of the stabilizing plate 61 side are mounted slightly away from the free rotary surface plane N of the magnetic disc 14 to a supporting unit (not shown).

Therefore, in association with high-speed rotation of the magnetic disc 14, a negative pressure is generated between the inclined surface 64 of the stabilizing plate 61 and the magnetic disc 14, the magnetic disc 14 is elastically deformed and attracted towards the stabilizing plate 61 side, and one recording surface 18 comes in sliding contact with the head body 22 of the magnetic head 62. The other magnetic head 65 approaches and comes in sliding contact with the other recording surface 17 of the magnetic disc 14 thus stably maintained.

Since the stabilizing plate 61 attracts the magnetic disc 14 to one side to achieve stable positioning to the individual magnetic heads 62 and 65, it involves only a very small frictional resistance and thus abrasion to the magnetic disc 14 and the magnetic heads 62 and 65 can be prevented, compared to prior art regulating members 19 and the like which directly pinch the magnetic disc 14 from both sides.

Figure 13:
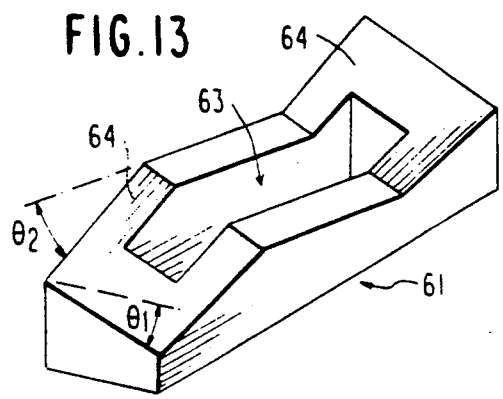
FIG. 13 is a schematic enlarged perspective view showing a stabilizing plate.

Furthermore, in this case, in order to overcome the problem in that only very small portions of the gaps 23 of the magnetic heads 62 and 65 are able to slidingly contact the recording surfaces 18 and 17 in association with the deformation of the magnetic disc 14, the following configuration is added. The inclined surface 64, in addition to the inclination (angle $\theta_2$) formed along the circumferential direction of the magnetic disc 14, as shown in FIG. 11, is inclined (e.g. with angle $\theta_1°$ to gradually become farther from the free rotary surface plane N of the magnetic disc 14 towards the outer peripheral side in the radial direction (arrow D) of the magnetic disc 14. FIG. 13 is a schematic perspective view of the stabilizing plate 61 of such a configuration.

Figure 14:
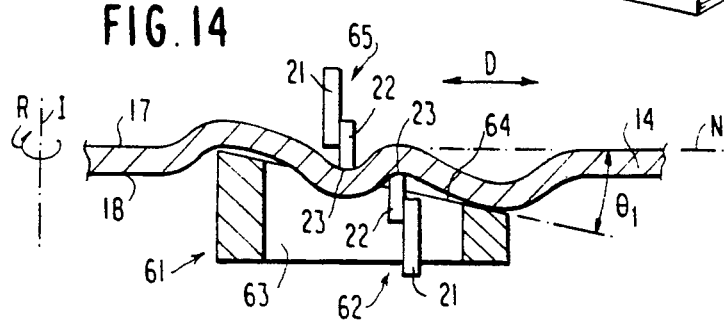
FIG. 14 is a schematic enlarged cross sectional view showing the stabilizing plate in FIG. 11.

Therefore, as shown in FIG. 14 which is an enlarged view of the stabilizing plate 61 in FIG. 11, the magnetic disc 14 stably maintained by the function of the stabilizing plate 61 is attracted towards the stabilizing plate 61 side to a greater extent at the outer peripheral side than the inner peripheral side of the stabilizing plate 61. As a result, the entire portions of the gaps 23 of the individual magnetic heads 62 and 65 can be caused to slidingly contact the individual recording surfaces 18 and 17 of the magnetic disc 14, thereby obtaining a very good head contact.

Figure 15:
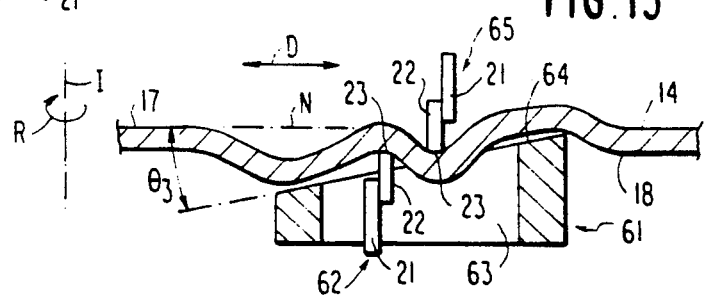
FIG. 15 is a schematic enlarged cross sectional view showing another embodiment of the present invention.

FIG. 15 shows another embodiment of the present invention. In this embodiment, the magnetic head 65 disposed at the opposite side (upper side) to the stabilizing plate 61 across the magnetic disc 14 is positioned at an outer peripheral side of the magnetic disc 14 with respect to the magnetic head 62 of the stabilizing plate 61 side. In this case, deformation condition of the magnetic disc 14 is the reverse of the previous embodiment, and inclination ($\theta_1$) of the stabilizing plate 61 along the radial direction to improve the sliding contact condition of the gaps 23 is also the reverse of the previous embodiment.

Specifically, the inclined surface 64 of the stabilizing plate 61 is inclined (e.g. with angle $\theta_3°$ as shown) to gradually become closer to the free rotary surface plane N of the magnetic disc 14 towards the outer peripheral side in the radial direction (arrow D) of the magnetic disc 14. Inclination of the inclined surface 64 along the circumferential direction is the same as that in the previous embodiment. As a result, the gaps 23 of the individual magnetic heads 62 and 65 are able come over their entire widths in sliding contact with the recording surfaces 18 and 17 of the magnetic disc 14, thereby obtaining a good and stable head contact.

Figure 16:
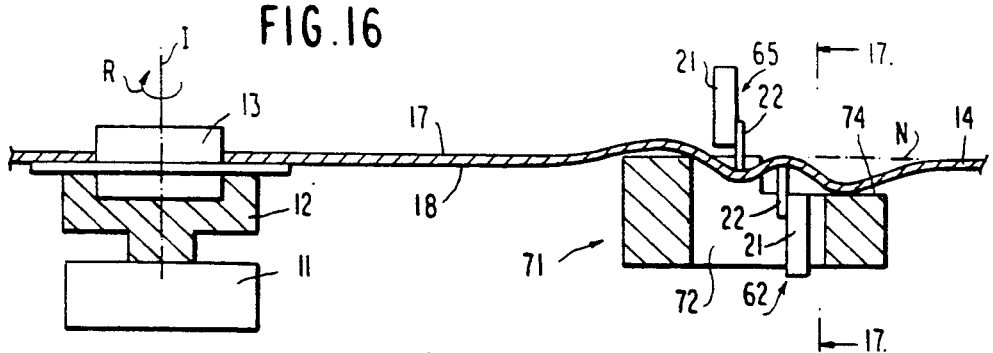
FIG. 16 is a schematic cross sectional view showing another embodiment of the present invention.
Figure 17:
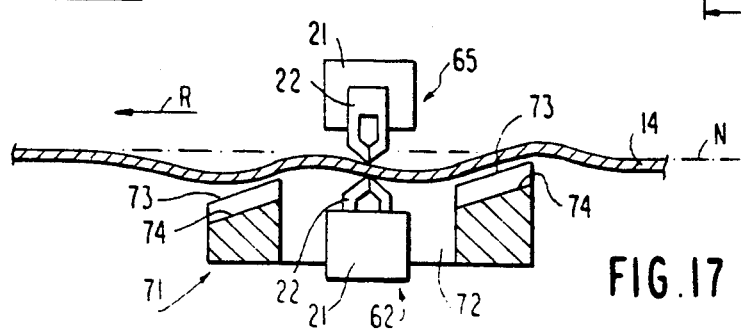
FIG. 17 is a schematic cross sectional view taken along line XVII—XVII in FIG. 16.
Figure 18:
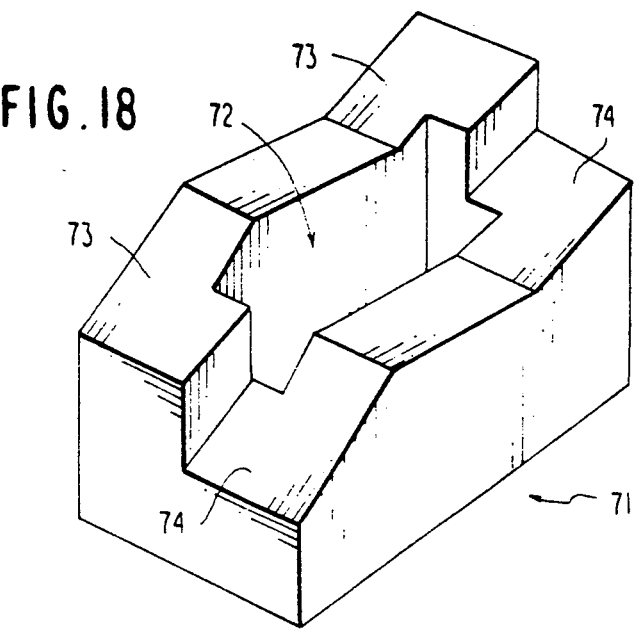
FIG. 18 is a schematic enlarged perspective view showing a stabilizing plate.

FIG. 16 shows another embodiment of the present invention. FIG. 17 is a schematic cross sectional view taken along line XVII—XVII in FIG. 16, and FIG. 18 is a schematic perspective view of a stabilizing plate used in this embodiment. The same parts and components as those used in the above-described embodiments are indicated by the same reference numbers and detailed description thereof is omitted.

As shown in these Figures, a stabilizing plate 71 disposed below the magnetic disc 14 is provided with a vertical through hole 72 in which the magnetic head 62 is inserted. In the through hole 72 is disposed the magnetic head 62 opposing one recording surface 18 of the magnetic disc 14. On the side opposite to the stabilizing plate 71 across the magnetic disc 14 is disposed another magnetic head 65 shifted to the inner peripheral side of the magnetic disc 14 with respect to the magnetic head 62.

In this case, the surface of the stabilizing plate 71 opposite to the magnetic disc 14 is formed in steps, with an opposing surface 73 at the inner half side positioned closer to the free rotary surface plane N of the magnetic disc 14 than an opposing surface 74 at the outer half side.

These opposing surfaces 73 and 74, as in the above-described embodiments, are inclined to gradually become farther from the free rotary surface plane N of the magnetic disc 14 towards the downstream side with respect to the rotational direction (arrow R) of the magnetic disc 14. FIG. 18 is a schematic perspective view of the stabilizing plate 71 alone.

Therefore, as shown in FIG. 17, in association with high-speed rotation of the magnetic disc 14, a negative pressure is generated between the inclined opposing surfaces 73 and 74 and the magnetic disc 14 to attract the magnetic disc 14 downward to the magnetic head 62 to come in sliding contact with the magnetic head 62, thereby achieving recording and reproduction on one recording surface 18. At the same time, the other magnetic head 65 comes in sliding contact with the magnetic disc 14, thereby achieving recording and reproduction on the other recording surface 17.

Figure 19:
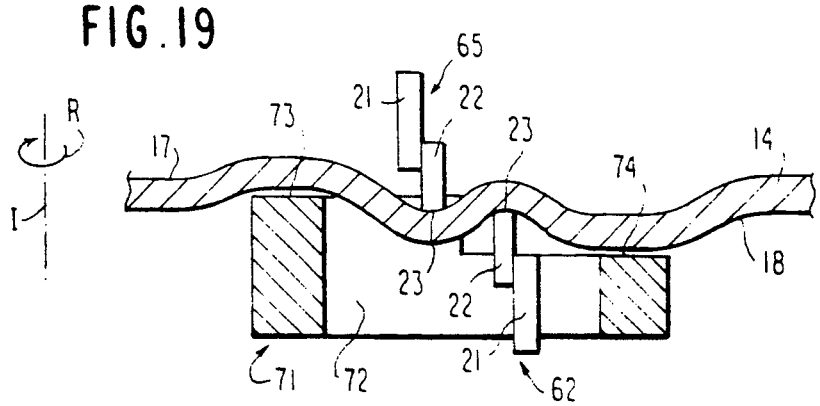
FIG. 19 is a schematic enlarged cross sectional view showing the stabilizing plate in FIG. 16.

As shown in FIG. 19 which is an enlarged cross sectional view of the stabilizing plate 71 in FIG. 16, in the opposing surfaces 73 and 74 formed in steps on the stabilizing plate 71, since the inner opposing surface 73 is positioned closer to the free rotary surface plane N than the outer opposing surface 74, the outer side of the deformed magnetic disc 14 is pulled down to a greater extent to the stabilizing plate 71 side, whereby the entire portions of the individual gaps of the magnetic heads 62 and 63 are able to come in sliding contact with the individual recording surfaces 18 and 17 of the magnetic disc 14.

As a result, a good and stable head contact is achieved with a very small frictional resistance in this embodiment.

Figure 20:
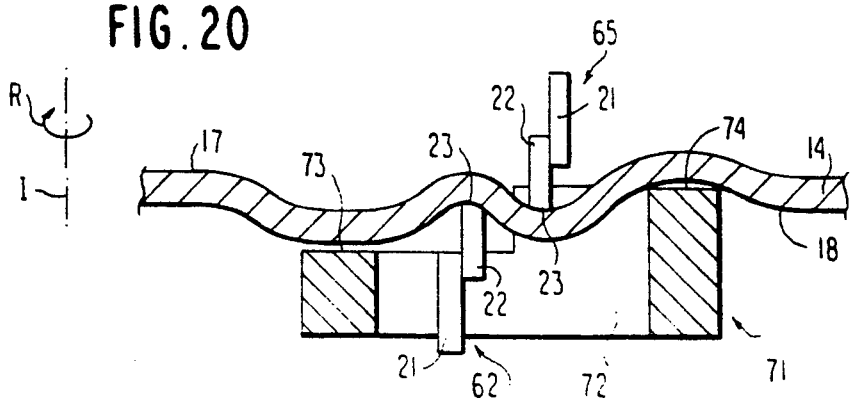
FIG. 20 is a schematic enlarged cross sectional view showing another embodiment of the present invention.

FIG. 20 shows a modification of the embodiment shown in FIG. 16. In this example, the magnetic head 65 disposed at the opposite side to the stabilizing plate 71 across the magnetic disc 14 is positioned at an outer peripheral side of the magnetic disc 14 with respect to the magnetic head 62 of the stabilizing plate 71 side. In this case, the deformation condition of the magnetic disc 14 is the reverse of the above embodiment. Therefore, the steps of the stabilizing plate 71 to improve sliding contact with the gaps 23 are also the reverse of the above embodiment.

Specifically, the inner half side opposing surface 73 of the stabilizing plate 71 is positioned farther from the free rotary surface plane N of the magnetic disc 14 compared to the outer half side opposing surface 74. Inclinations of these opposing surfaces 73 and 74 along the circumferential direction are same as those in the embodiment described with reference to FIG. 17. Thus, in this embodiment, the gaps 23 of the magnetic heads 62 and 65 come over the entire portions in sliding contact with the recording surfaces 18 and 17 of the magnetic disc 14, thereby obtaining a good and stable head contact.

In the above-described embodiments, the stabilizing plates to generate a negative pressure between the stabilizing plates and the magnetic disc 14 in asssociation with high-speed rotation of the magnetic disc are formed as stabilizing plates 61 and 71 which have inclined surfaces. Alternatively, however, a recess opposing the magnetic disc 14 may be formed on the stabilizing plates. Furthermore, structure of the magnetic heads 62 and 65 is not restricted to these embodiments, and the driving and supporting mechanisms to cause the magnetic heads 62 and 65 to come in sliding contact with the magnetic disc 14 and the supporting mechanisms of the stabilizing plates 61 and 71 are not restricted to these embodiments but may be flexibly designed.

Figure 21:
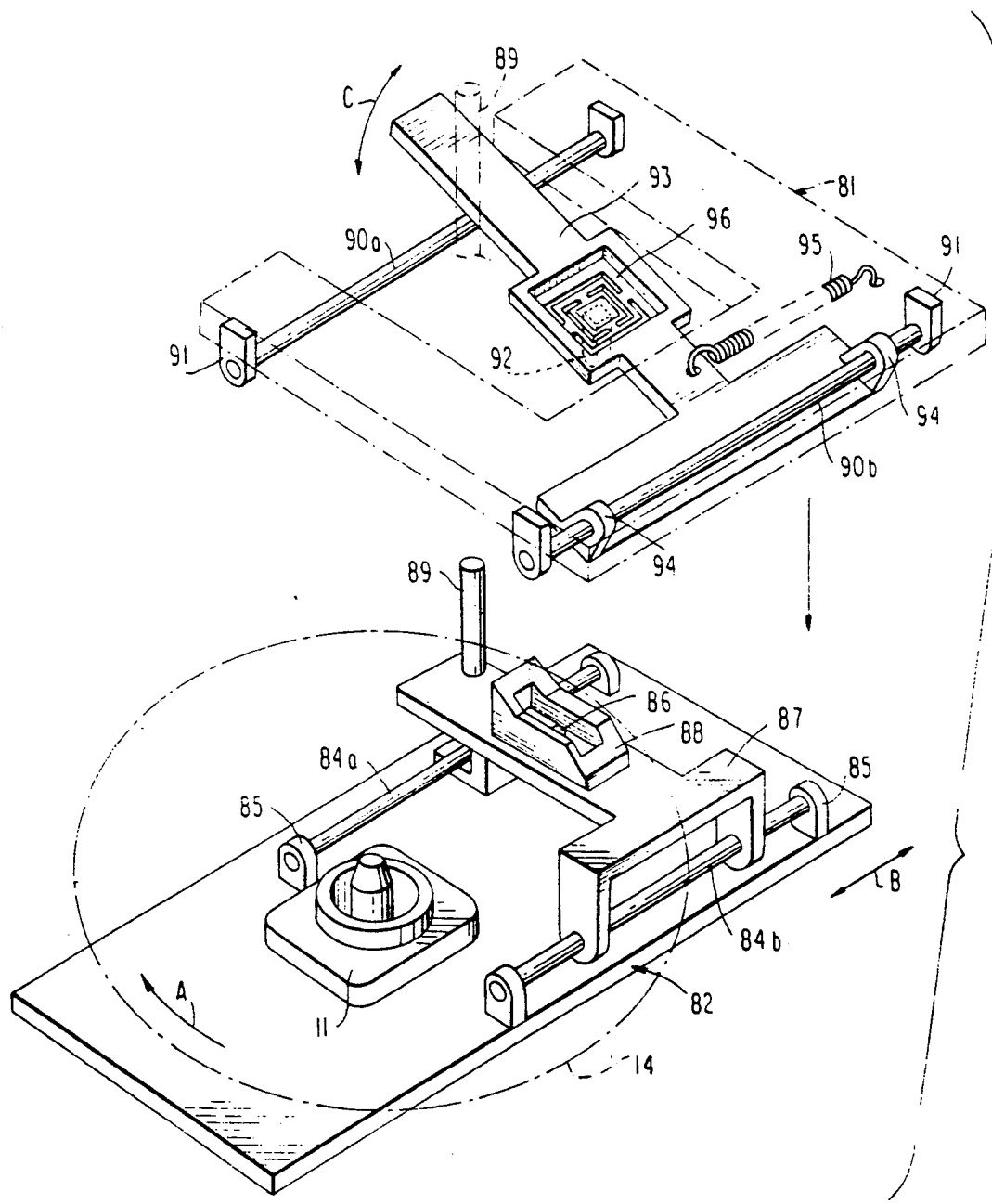
FIG. 21 is a schematic exploded perspective view showing another embodiment of the present invention.

Another embodiment of the present invention will now be described. Referring to FIG. 21, upper and lower blocks 81 and 82 are disposed across the magnetic disc 14, and the lower block 82 is mounted with a spindle motor 11 to rotate the magnetic disc 14 in the direction of the arrow shown in the Figure.

Parallel guide bars 84a and 84b are fixedly mounted onto the upper surface of the lower block 82 through individual brackets 85, and on these guide bars 84a and 84b is slidably supported a lower head carriage 87 to which a lower magnetic head 86 is mounted upward. The lower head carriage 87 is driven by a drive mechanism (not shown) along the guide bars 84a and 84b, whereby the lower magnetic head 86 is positioned in the radial direction (arrow B) of the magnetic disc 14 which is mounted to the spindle motor 11.

Figure 22A:
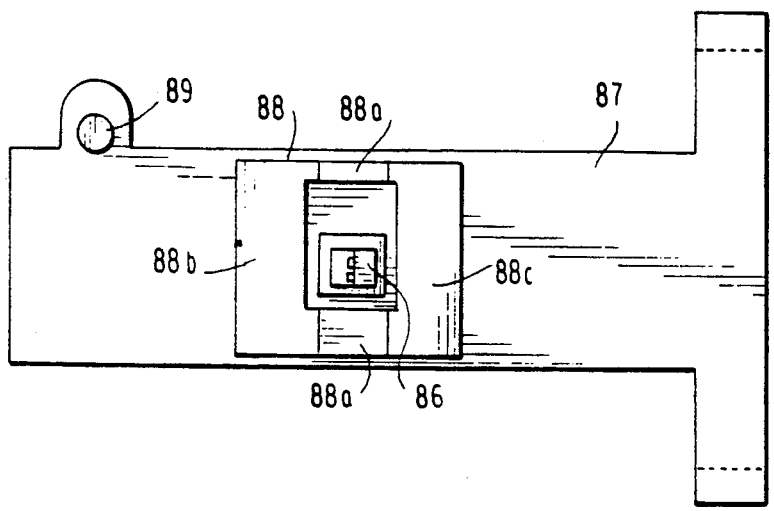
FIGS. 22(A) and (B) are schematic plan and side views showing a lower head carriage.
Figure 22B:
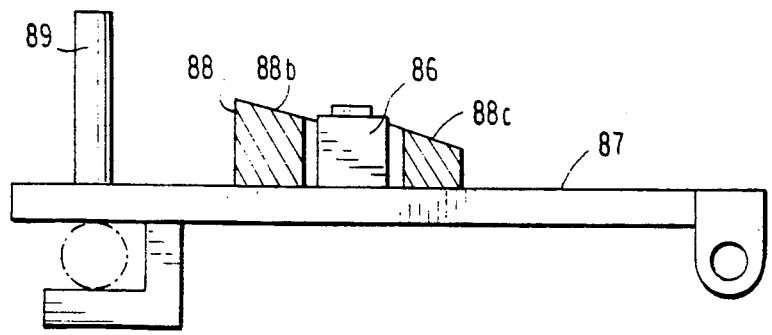
Figure 24:
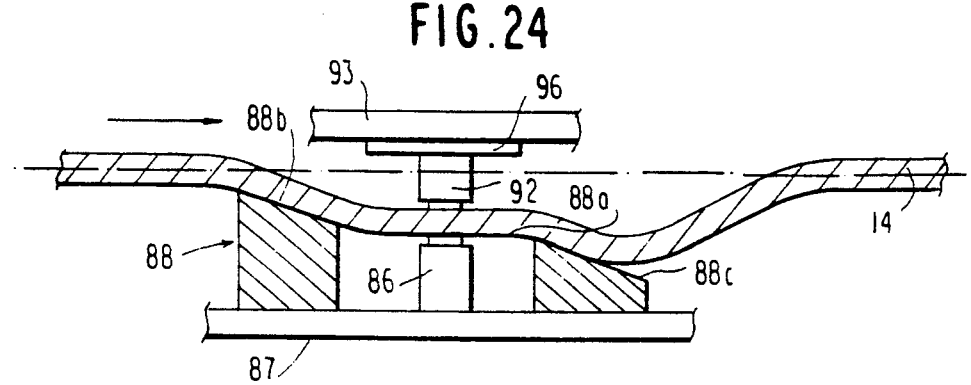
FIG. 24 is a schematic broken side view showing part of FIG. 21.
Figure 25:
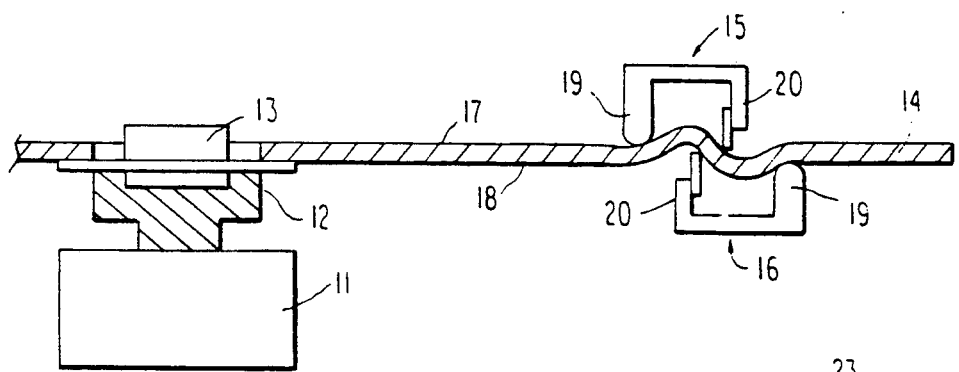
FIG. 25 is a schematic cross sectional view showing the structure of an example of prior art two-sided magnetic recording and reproduction device.
Figure 26:
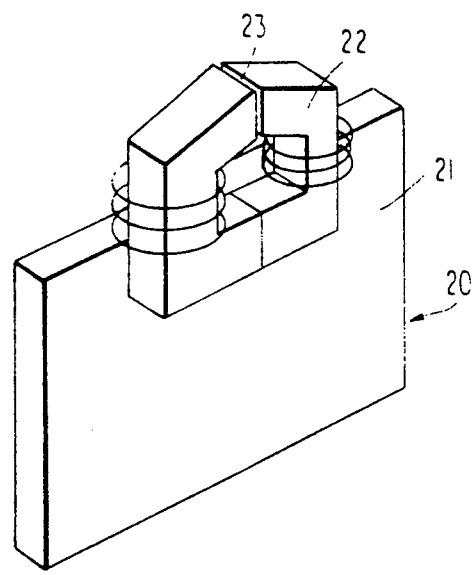
FIG. 26 is a schematic enlarged perspective view showing a magnetic head.
Figure 27:
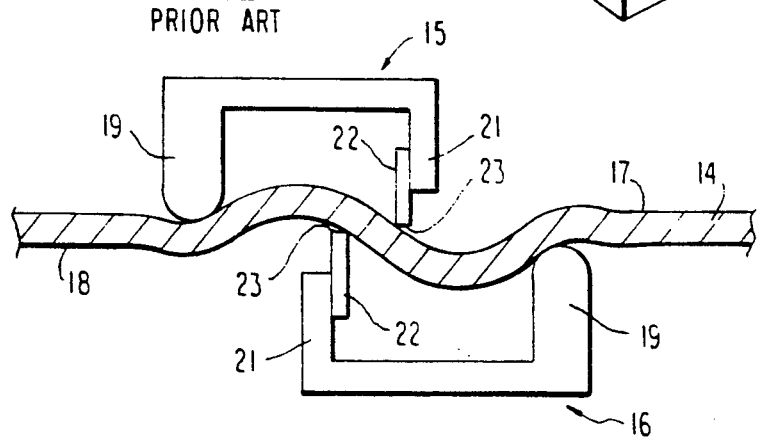
FIG. 27 is a schematic enlarged cross sectional view showing a magnetic head member.

Also as shown in FIGS. 22(A) and (B) and FIG. 24, on the lower head carriage 87 is mounted a rectangular frame-formed stabilizing plate 88 surrounding the lower magnetic head 86, and an engaging pin 89 to drive an upper head carriage 93 (described later) is disposed vertically at one side of the stabilizing plate 88.

The stabilizing plate 88 is to maintain a good contact of the magnetic disc 14 with the lower magnetic head 86. Its upper surface is formed with two inclined surfaces 88b and 88c opposite to the magnetic disc 14, which are positioned respectively at the upstream and downstream sides with respect to the rotational direction (arrow A) of the magnetic disc 14 across the flat surfaces 88a, which is almost parallel to the free rotary surface plane N (FIG. 24) of the magnetic disc 14, and inclined to become farther from the free rotary surface plane N towards the downstream side with respect to the rotational direction (arrow A) of the magnetic disc 14.

On the lower surface of the U-shaped upper block 81 are fixedly mounted two parallel guide bars 90a and 90b corresponding to the above-described guide bars 84a and 84b through individual brackets 91, and on the guide bars 90a and 90b is slidably supported an upper head carriage 93 to which an upper magnetic head 92 is mounted downward.

Figure 23A:
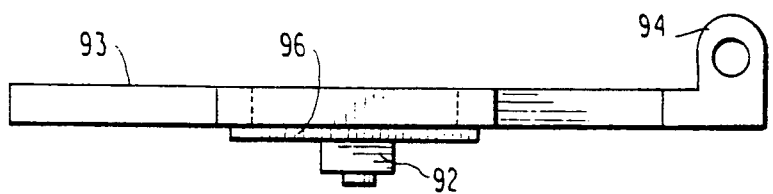
FIGS. 23(A) and (B) are schematic side and bottom views showing an upper head carriage.
Figure 23B:
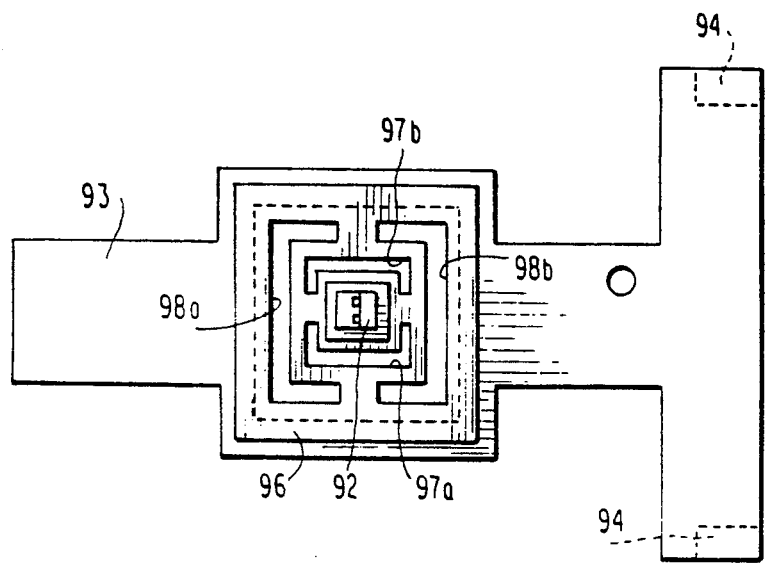

As shown also in FIGS. 23(A) and (B), the upper head carriage 93 is formed in nearly a T-shape, the elongate mounting end formed along the one guide bar 90b is rotatably supported on the guide bar 90b so that the front end is vertically rotatable (arrow C in FIG. 21) through a pair of brackets 94, and the front end crossing the other guide bar 90a engages with the engaging pin 89, whereby the upper head carriage 93 is slidably movable together with the lower head carriage 87 in the direction approaching the spindle motor 11. Numeral 95 in FIG. 21 indicates a tension spring which urges the upper head carriage 93 in the direction to become farther from the spindle motor 11.

Furthermore, the middle portion of the upper head carriage 93 is cut out to a square-formed opening, an elastic plate 96 is mounted to cover the opening, and the upper magnetic head 92 is vertically mounted onto the lower center of the elastic plate 96.

The elastic plate 96 is to provide a small vertical dislocation mainly in the vertical direction (arrow C in FIG. 21) of the upper magnetic head 92, and is provided with rectangular holes 97a and 97b symmetrically surrounding the upper magnetic head 92 disposed at the center from its front and rear sides and, at the outside of these rectangular holes 97a and 97b, also with rectangular holes 98a and 98b symmetrically surrounding the upper magnetic head 92 from its right and left sides, forming a gimbal spring plate.

With this arrangement, the magnetic disc 14 mounted to the spindle motor 11 is driven by the spindle motor 11 to rotate at a high speed in the direction of arrow A, and the upper and lower magnetic heads 92 and 86 come in sliding contact with the upper and lower surfaces of the magnetic disc 14, thereby making simultaneous recording and reproduction on both sides of the magnetic disc. Furthermore, by moving the upper and lower head carriages 93 and 87 by a drive unit (not shown) (and by the tension spring 25), the upper and lower magnetic heads 92 and 86 can be freely moved and positioned in the radial direction of the magnetic disc 14, thereby changing the tracks on both sides of the magnetic disc to be recorded and reproduced.

In the recording and reproduction, a negative pressure is generated between the lower surface of the magnetic disc 14 and the two inclined surfaces 88b and 88c of the stabilizing plate 88 to attract the magnetic disc 14 towards the stabilizing plate 88. As a result, the lower surface of the magnetic disc 14 positively comes in sliding contact with the tip of the lower magnetic head 86 disposed at the flat surface 88a between the inclined surfaces 88b and 88c, thereby achieving a good head contact (FIG. 24).

In addition, the tip of the upper magnetic head 92 supported on the upper head carriage 93 through the elastic plate 96 comes in soft contact with the upper surface of the magnetic disc 14, whereby the frictional resistance to the magnetic disc 14 is reduced and assembly error of the upper magnetic head 92 is absorbed to achieve a good head contact. When the upper magnetic head 92 is offset with respect to the lower magnetic head 86 in a specific direction, even if the magnetic disc 14 is largely deformed by the attraction of the stabilizing plate 88, the upper magnetic head 92 is dislocated to follow the magnetic disc 14, thereby easily achieving a good head contact. In other words, a good head contact is assured without strict position adjustment of the upper magnetic head 92 in the assembly.

In this embodiment, the stabilizing plate is not restricted to the shape and structure as shown, but any arrangement may be used which is able to generate a negative pressure between the stabilizing plate 88 and the magnetic disc 14 in association with rotation of the magnetic disc 14 to attract the magnetic disc 14 towards the lower magnetic head 86 side. Furthermore, the present invention does not necessarily require the stabilizing plate 88, but can be applied to a device which has the upper and lower magnetic heads 92 and 86 disposed opposite to each other.

Furthermore, in this embodiment, the upper magnetic head 92 may be supported by another spring member instead of the elastic plate 96. In the present invention, when the stabilizing plate 88 is disposed at the upper magnetic head 92 side, it is obvious that the lower magnetic head 86 is elastically supported on the lower head carriage 87.

Since the two-sided magnetic recording and reproduction device according to the present invention is very simple in structure in which a single negative pressure generating type stabilizing plate is used to achieve good contact of the two magnetic heads for the front and backside of the magnetic disc, position adjustment and assembly work of the individual members can be simplified to achieve a reduction in cost, the frictional resistance of the stabilizing plate to the magnetic disc can be reduced to reduce the driving torque, and abrasion to the magnetic disc and the magnetic heads can be suppressed.

Furthermore, since the upper and lower heads are inclined to the inside and outside with respect to the magnetic disc, or, the surface of the stabilizing plate opposing the magnetic disc is inclined in the direction to the inner and outer peripheral sides, the gaps of the upper and lower magnetic heads are caused over their entire widths to come in sliding contact, thereby achieving a very good and stable head contact.

In addition, since there is provided supporting means for elastically supporting one of the upper and lower magnetic heads, a good contact of the magnetic heads following the magnetic disc is achieved, thereby enabling stable recording and reproduction.

We claim:

1. A two-sided magnetic recording and reproduction device for causing a rotating flexible magnetic disc to rotate in a free rotary surface plane and come in sliding contact against opposing magnetic heads, the free rotary surface plane being defined as a rotating surface plane of said magnetic disc rotating with no additional external forces acting thereon, said magnetic disc having first and second recording surfaces respectively disposed on opposite sides thereof, said recording and reproduction device comprising:

a negative pressure generating type stabilization plate disposed opposite to said magnetic disc;

a first magnetic head provided on said stabilizing plate and which slidingly contacts the first recording surface of said magnetic disc; and a second magnetic head disposed movably closer to and away from said stabilizing plate across said magnetic disc and which slidingly contacts the second recording surface of said magnetic disc;

wherein said stabilization plate comprises:

a surface opposing said magnetic disc;

a recess in said stabilizing plate on the surface opposing said magnetic disc and which surrounds said first magnetic head; and inclined surfaces disposed at each end of said stabilizing plate at the upstream and downstream side with respect to the rotational direction of said magnetic disc and opposing said magnetic disc, said inclined surfaces being inclined with respect to said opposing surface so as to gradually move away from the free rotary surface plane in a direction towards the downstream side with respect to the rotational direction of the said magnetic disc.

2. A two-sided magnetic recording and reproduction device for causing a rotating flexible magnetic disc to rotate in a free rotary surface plane and come in sliding contact against opposing magnetic heads, the free rotary surface plane being defined as a rotating surface plane of said magnetic disc rotating with no additional external forces acting thereon, said magnetic disc having first and second recording surfaces respectively disposed on opposite sides thereof, said recording and reproduction device comprising:

a first magnetic head mounted on a mounting means and having a gap, said gap of said first magnetic head adapted to slidingly contact the first recording surface of said magnetic disc;

a second magnetic head mounted on a mounting means and having a gap, said gap of said second magnetic head adapted to slidingly contact the second recording surface of said magnetic disc, said second magnetic head being disposed at one of radially inside and outside of said magnetic disc with respect to said first magnetic head; and a stabilizing plate disposed opposite to the first recording surface of said magnetic disc and for generating a negative pressure between said stabilizing plate and said magnetic disc in association with the rotation of said magnetic disc, to attract said magnetic disc towards said gap of said first magnetic head and achieve sliding contact therewith;

wherein when said second magnetic head is disposed radially inwardly with respect to said first magnetic head, said mounting means of said second magnetic head and said second magnetic head are inclined outwardly, generally towards said first magnetic head, and said mounting means of said first magnetic head and said first magnetic head are inclined inwardly, generally towards said second magnetic head, or when said second magnetic head is disposed radially outwardly with respect to said first magnetic head, said mounting means of said second magnetic head and said second magnetic head are inclined inwardly, generally towards said first magnetic head, and said mounting means of said first magnetic head and said first magnetic head are inclined outwardly, generally towards said second magnetic head.

3. A two-sided magnetic recording and reproduction device for causing a rotating flexible magnetic disc to rotate in a free rotary surface plane and come in sliding contact against opposing magnetic heads, the free rotary surface plane being defined as a rotating surface plane of said magnetic disc rotating with no additional external forces acting thereon, said magnetic disc having first and second recording surfaces respectively disposed on opposite sides thereof, said recording and reproduction device comprising:

a first magnetic head having a gap, said gap of said first magnetic head adapted to slidingly contact the first recording surface of said magnetic disc;

a second magnetic head having a gap, said gap of said second magnetic head adapted to slidingly contact the second recording surface of said magnetic disc, said second magnetic head being disposed at one of radially inside and outside of said magnetic disc with respect to said first magnetic head; and a stabilizing plate having a radially inner portion and a radially outer portion and disposed opposite to the first recording surface of said magnetic disc and for generating a negative pressure between said stabilizing plate and said magnetic disc in association with the rotation of said magnetic disc, to attract said magnetic disc towards said gap of said first magnetic head and achieve sliding contact therewith;

wherein when said second magnetic head is disposed radially further inwardly with respect to said first magnetic head, the radially outer portion of said stabilizing plate is further away from the free rotary surface plane than the radially inner portion of said stabilizing plate, or when said second magnetic head is disposed radially further outwardly with respect to said first magnetic head, the radially outer portion of said stabilizing plate is closer to the free rotary surface plane than the radially inner portion of said stabilizing plate.

* * * * *